(12) United States Patent
Todd et al.

(10) Patent No.: US 7,848,237 B2
(45) Date of Patent: Dec. 7, 2010

(54) SYSTEM AND METHOD FOR SELECTIVE PACKET DISCARD FOR THE TRANSPORT OF MULTIPLE TRANSPORTATION STREAMS OF STREAMING MEDIA IN PACKET-BASED NETWORKS

(75) Inventors: Marc A. C. Todd, Foxboro, MA (US); Richard T. Holleran, Attleboro, MA (US); James T. Welch, Mashpee, MA (US)

(73) Assignee: IneoQuest Technologies, Inc., Mansfield, MA (US)

( * ) Notice: Subject to any disclaimer, the term of this patent is extended or adjusted under 35 U.S.C. 154(b) by 479 days.

(21) Appl. No.: 11/654,746

(22) Filed: Jan. 18, 2007

(65) Prior Publication Data

US 2008/0175148 A1 Jul. 24, 2008

(51) Int. Cl.
*G01R 31/08* (2006.01)
(52) U.S. Cl. .................................. 370/235; 370/395.41
(58) Field of Classification Search ................ 370/235, 370/412, 389, 241, 432, 395.41; 725/114; 709/232
See application file for complete search history.

(56) References Cited

U.S. PATENT DOCUMENTS

| | | | | |
|---|---|---|---|---|
| 5,905,713 | A * | 5/1999 | Anderson et al. | 370/241 |
| 6,728,270 | B1 * | 4/2004 | Meggers et al. | 370/514 |
| 6,738,813 | B1 | 5/2004 | Reichman | |
| 6,771,653 | B1 * | 8/2004 | Le Pennec et al. | 370/412 |
| 6,807,156 | B1 | 10/2004 | Veres et al. | |
| 6,928,055 | B2 | 8/2005 | Ni | |
| 7,305,696 | B2 * | 12/2007 | Thomas et al. | 725/114 |
| 2003/0033403 | A1 | 2/2003 | Rhodes | |
| 2003/0035374 | A1 * | 2/2003 | Carter et al. | 370/235 |
| 2004/0136327 | A1 | 7/2004 | Sitaraman et al. | |
| 2004/0196790 | A1 * | 10/2004 | Balakrishnan et al. | 370/232 |
| 2004/0215807 | A1 * | 10/2004 | Pinder et al. | 709/232 |
| 2005/0041679 | A1 * | 2/2005 | Weinstein et al. | 370/432 |
| 2005/0152375 | A1 * | 7/2005 | An et al. | 370/395.41 |
| 2007/0058548 | A1 * | 3/2007 | Babonneau et al. | 370/235.1 |
| 2007/0165621 | A1 * | 7/2007 | Cheung et al. | 370/389 |

OTHER PUBLICATIONS

Ravindra G, N Balakrishnan, K R Ramakrishnan, "Active Router Approach for Selective Packet Discard of Streamed MPEG video under Low Bandwidth Conditions", 0-7803-6536-4/00, 2000 IEEE, pp. 739-742.

(Continued)

*Primary Examiner*—Steven H Nguyen
*Assistant Examiner*—Syed Bokhari
(74) *Attorney, Agent, or Firm*—Holland & Knight LLP; Brian J. Colandreo, Esq.; J. Mitchell Herbert, Jr., Esq.

(57) ABSTRACT

A system and method is provided for reducing the bandwidth of MPEG transport streams during transmission over a packet-switched network. The system and method identifies characteristics of a plurality of media fragments disposed within each of a plurality of packets of a transport stream, and aggregates the characteristics into a summary value for each of the packets. The summary value is correlated to a priority weighting identifiable by a network element. Each of the packets is marked with the priority weighting, so that the packets may be selectively dropped by a network element in accordance with their priority weightings to reduce the bandwidth of the transport stream.

32 Claims, 5 Drawing Sheets

OTHER PUBLICATIONS

Ruibiao Qiu, Wei Yu, "An Efficient Quality Scalable Motion-JPEG2000 Transmission Scheme", WUCS-01-37, 2001, Department of Computer Science, Washington University, St. Louis, MO, 9 pages.

Ranga S. Ramanujan, Jim A. Newhouse, Maher N. Kaddoura, Atiq Ahamad, Eric R. Chartier, and Kenneth J. Thurber, "Adaptive Streaming of MPEG Video over IP Networks", Architecture Technology Corporation, Proceedings of the 22nd IEEE Conference on Computer Networks (LCN'97), Nov. 1997, 12 Pages.

Wu-chang Feng*, Dilip D. Kandlur, Debanjan Saha, Kang G. Shin*, "Adaptive Packet Marking for Providing Differentiated Services in the Internet", *Department of EECS, University of Michigan, Ann Arbor, Mi., **Network Systems Department, IBM T.J. Watson Research Center, Yorktown Heights, NY, 10 pages.

Sebastian Zander, Georg Carle, "High Quality IP Video Streaming with Adaptive Packet Marking", B. Stiller et al. (Eds.): QofIS/ICQT 2002, LNCS 2511, pp. 68-77, 2002. Springer-Verlag Berlin Heidelberg 2002.

* cited by examiner

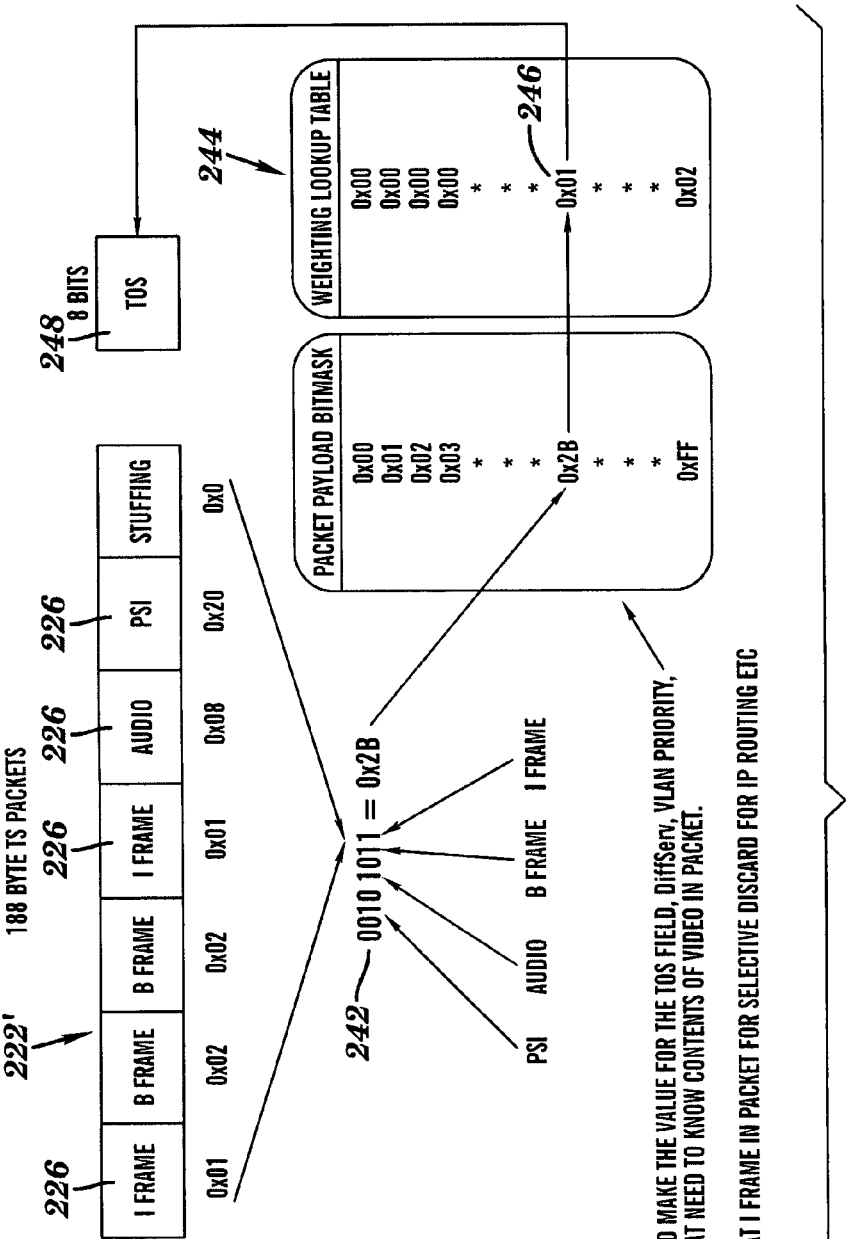

SYSTEM AND METHOD FOR SELECTIVE PACKET DISCARD FOR THE TRANSPORT OF MULTIPLE TRANSPORTATION STREAMS OF STREAMING MEDIA IN PACKET-BASED NETWORKS

BACKGROUND

1. Technical Field

The present invention relates generally to the field of data streaming. More specifically, the present invention is related to transporting streaming data in packetized form.

2. Background Information

Many electronic networks such as local area networks (LANs), metropolitan area networks (MANs), and wide area networks (WANs) are increasingly being used to transport streaming media whose real-time data transport requirements exhibit high sensitivity to data loss and delivery time distortion. The technical literature describes various schemes to implement Quality of Service (QoS) on such networks to address the requirements of streaming media, especially when intermixed with conventional, time-insensitive, guaranteed delivery protocol stack data traffic. For efficiency reasons, the streaming media transport often uses a non-guaranteed delivery upper layer protocol stack such as UDP/IP making recovery of data in the presence of packet loss difficult without additional bandwidth-consuming Forward Error Correction (FEC) flows.

The transport environment may dynamically vary the streams, such as by dropping packets to reduce bandwidth in response to transient congestion. Various methods for effecting these packet drops include a receiving device dynamically indicating to an upstream router or stream encoder, whether and how much of a bandwidth reduction is desired based on current network conditions. A drawback of these conventional methods is that the resulting bandwidth reduction is often accompanied by an adverse impact on received video quality.

One conventional approach for effecting packet drops is disclosed by Ravindra et al., in "Active Router Approach for Selective Packet Discard of Streamed MPEG video under Low Bandwidth Conditions", 0-7803-6536-4/00, 2000 IEEE. This approach uses an active router to selectively drop MPEG video packets based on a client's requests or on router-detected bandwidth constraints. Information such as the number of lost packets in a window interval, contained in RTCP messages from client to server are intercepted by the active router application, and used to reduce bandwidth. MPEG frame types such as Bs then Ps may be dropped, starting with the last Ps in a GOP to assure that other Ps can be decoded. In this example, an active agent in the router closest to client acts as a proxy for the client to signal the server to change the frame rate sent.

Ruibiao Qiu and Wei Yu, in "An Efficient Quality Scalable Motion-JPEG2000 Transmission Scheme", WUCS-01-37, 2001, Department of Computer Science, Washington University, St. Louis, Mo., disclose a quality adaptation for Motion-JPEG2000 streams which makes use of its wavelet encoding techniques. A TxMapper and a RxMapper logical engine is used to add a header to each packet which can be used to identify the packet's priority in delivering perceptual quality and allows processing by a router accordingly. An active router plug-in acts on local congestion info and the header information to prioritize/select packet drops.

Ramanujan et al., in "Adaptive Streaming of MPEG Video over IP Networks", Architecture Technology Corporation, Proceedings of the $22^{nd}$ IEEE Conference on Computer Networks (LCN'97), November 1997, disclose another adaptive video streaming approach. A video adaptation algorithm may adjust the signal-to-noise ratio (SNR) and the displayed frame rate of the video by selective frame dropping. Multiple adaptations such as spectral filtering, quantization filtering, macroblock filtering (frame dropping) and playback dilation are used. The chosen adaptation is based on available underlying QoS, best feasible perceptual quality for the video played by receiver, and operator discretion of what constitutes best perceptual quality.

Wu-chang Feng et al., in "Adaptive Packet Marking for Providing Differentiated Services in the Internet", (University of Michigan and IBM) use a service model with a soft bandwidth guarantee, disclosed as eliminating the need for end-to-end signaling and enforcement of traffic profiles. This approach is aimed at enhancement to Internet service and employs adaptive traffic control at the host and at the edges of the network. It assumes that a low priority, best effort and a high priority service is available in the network. A Packet Marking Engine (PME) monitors traffic and if observed throughput falls below a target rate based on local indicators, packets are marked with high priority until the desired rate is reached. Generally, a stream would be sent with low priority TOS (best effort) and be changed to high priority by the PME when needed to most effectively use network resources.

Zander et al., in "High Quality IP Video Streaming with Adaptive Packet Marking", QofIS/ICQT 2002, LNCS 2511, pp. 68-77, 2002, dynamically change packet marking based on feedback from an end device receive buffer fill level. This approach depends on a relatively large playout buffer delay of several seconds to compensate for bandwidth fluctuations in the network. It assumes two service classes: guaranteed and best effort. If there is not enough bandwidth available (as detected by low fill level of the receiver playout buffer), then additional bandwidth is used from a guaranteed service based on the currently available best effort bandwidth and the receiver's playout buffer fill level.

While the foregoing approaches may provide a benefit in some applications, none of the approaches discloses or suggests operation on IP packets carrying Transport Stream payloads of the type used to transmit media such as MPEG video over packet switched networks. Therefore, whatever the precise merits, features, and advantages of the above-mentioned prior art schemes, they fail to achieve or fulfill the purposes of the present invention.

SUMMARY

In an aspect of the present invention, a method is provided for reducing the bandwidth of MPEG transport streams during transmission over a packet-switched network. The method includes identifying characteristics of a plurality of media fragments disposed within each of a plurality of packets of a transport stream, and aggregating the characteristics into a summary value for each of the plurality of packets. The summary value is correlated to a priority weighting identifiable by a network element. Each of the packets is marked with the priority weighting, so that the packets may be selectively dropped by a network element in accordance with their priority weightings to reduce the bandwidth of the transport stream.

In another aspect of the invention, an apparatus is provided for reducing the bandwidth of an MPEG transport stream during transmission over a packet-switched network. The apparatus includes means for identifying characteristics of a plurality of media fragments disposed within each of a plurality of packets of a transport stream, and means for aggregating the characteristics into a summary value for each of the plurality of packets. The apparatus also includes means for correlating the summary value to a priority weighting identifiable by a network element, means for marking each of the plurality of packets with the priority weighting, so that marked packets may be selectively dropped by a network element in accordance with their priority weightings to reduce the bandwidth of the transport stream.

Still another aspect of the invention includes an article of manufacture for reducing the bandwidth of MPEG transport streams during transmission over a packet-switched network, the article of manufacture. This article of manufacture includes a computer usable medium having a computer readable program code embodied therein for identifying characteristics of a plurality of media fragments disposed within each of a plurality of packets of a transport stream, and for aggregating the characteristics into a summary value for each of the plurality of packets. Program code is also provided for correlating the summary value to a priority weighting identifiable by a network element, and for marking each of the plurality of packets with the priority weighting, so that the packets are each configured for being selectively dropped by a network element in accordance with their priority weightings to reduce the bandwidth of the transport stream.

BRIEF DESCRIPTION OF THE DRAWINGS

The above and other features and advantages of this invention will be more readily apparent from a reading of the following detailed description of various aspects of the invention taken in conjunction with the accompanying drawings, in which:

FIG. 5A is a representation of an exemplary payload bit-mask scheme usable with the embodiments of FIGS. 2-4; and FIG. 5B is a schematic flowchart representation of operation of the embodiments of FIGS. 2-4.

DETAILED DESCRIPTION

Figure 1:
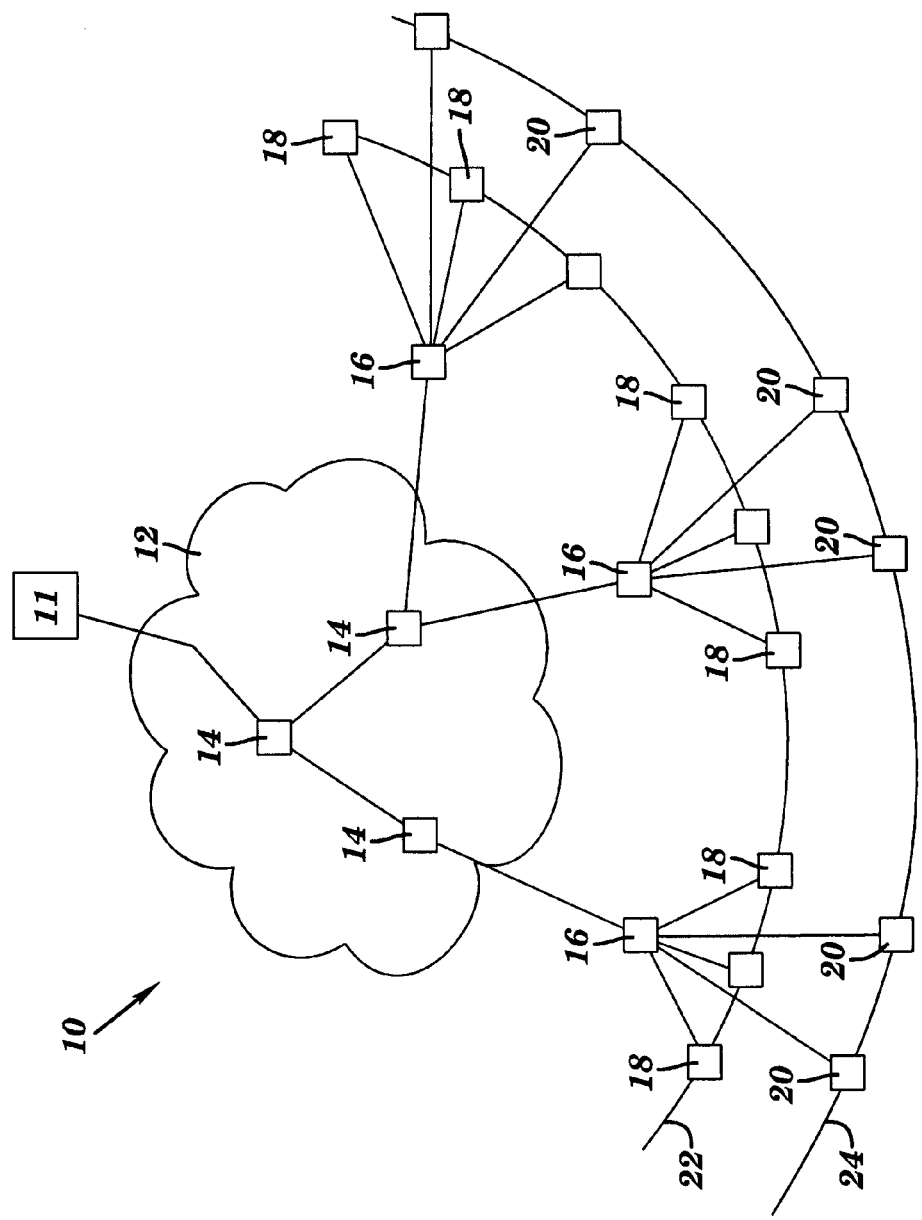
FIG. 1 is a schematic view of a network environment in which embodiments of the present invention may be deployed.

In the following detailed description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the spirit and scope of the present invention. The following detailed description is, therefore, not to be taken in a limiting sense, and the scope of the present invention is defined by the appended claims and their equivalents. For clarity of exposition, like features shown in the accompanying drawings shall be indicated with like reference numerals and similar features as shown in alternate embodiments in the drawings shall be indicated with similar reference numerals.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Many streaming media systems, such as Video on Demand (VoD), broadcast television control centers, or satellite-based video distribution operations utilize packetized data networks for their low-cost and omnipresence in modern data systems.

The instant inventors recognized that currently deployed (e.g., legacy) switches and routers include features that during the transport and delivery of streaming media, may be used to dynamically account for human perception when encountering transport-induced loss events. This use may advantageously deliver a relatively improved user Quality of Experience (QoE.) Embodiments of the present invention select and mark packets of an IP Transport Stream (TS) based on their visual impact, so that those packets having only the least impact on visual quality may be dropped in response to transient congestion conditions.

Embodiments of the present invention monitor existing video flows, such as Transport Streams of the pervasive MPEG (e.g., MPEG-2) compression algorithms, and dynamically mark the packets, based on their content, e.g., using conventional IP priority marking mechanisms. These embodiments thus provide a methodology to mark these flows for proper handling in conventional deployed IP networks using conventional (e.g., unmodified) routers.

As used herein, the term "transport stream" or "TS" refers to a series of packets commonly used in MPEG-1, MPEG-2, and MPEG-4 systems protocols. A transport stream allows multiplexing of digital video and audio and synchronization of output. The TS typically has features for error correction for transportation over imperfect media, and is used in broadcast applications. For example, the MPEG-2 transport stream is defined in the ISO/IEC standard 13818-1.

The Transport Stream provides a convenient means for multiplexing one or more video flows, audio flows, and timing and Program Specific Information (PSI). A typical MPEG 2 Transport Stream carries many individual streams of media traffic. Information is generally carried in 188 Byte long TS packets. Each 188 byte packet contains a 4-byte header, with a Program Identifier (PID) to identify which program the packet belongs to. Seven TS packets are usually packed together by an MPEG encoder and sent in a single IP packet using the UDP/IP protocol stack. Since an IP flow composed of a sequence of IP packets can thus contain both video, audio, and PSI information, and since each video stream is itself encoded with frames that have varying impact on the perceived decoded MPEG quality due to the MPEG compression process, a marking system that identifies IP packets based on their TS content may be valuable.

Embodiments of the invention provide IP marking methodology that places an indication of the content of IP packets in the IP TOS/DSCP field. The TOS/DSCP field typically contains a hexadecimal value defining a TOS (Type of Service) or DSCP (Diffserv Codepoint), which may be used by applications to indicate the priority and Quality of Service for each packet. For a TOS value, the 8-bit hexadecimal number breaks down as shown in the following Table I:

TABLE I

Bits 0-2: Precedence
Bit 3: 0 = Normal Delay, 1 = Low Delay
Bit 4: 0 = Normal Throughput, 1 = High Throughput
Bit 5: 0 = Normal Reliability, 1 = High Reliability
Bits 6-7: Explicit Congestion Notification The precedence bits (bits 0-2) break down as shown in the following Table II:

TABLE II

| | |
|---|---|
| 111 | Network Control |
| 110 | Internetwork Control |
| 101 | CRITIC/ECP |
| 100 | Flash Override |
| 011 | Flash |
| 010 | Immediate |
| 001 | Priority |
| 000 | Routine |

Conventionally, the TOS/DSCP fields are set by the originator of the data streams, and are common to an entire program stream, i.e., all IP packets within a particular stream are generally provided with the same TOS/DSCP indicator.

The embodiments of the present invention, however, analyze individual IP TS packets, and mark them in a manner that conventional deployed network elements (e.g., routers) can recognize, so that specific types of TS packets, which have relatively greater impact on perceived decoded quality may be prioritized, while allowing lower priority TS packets to be dropped, e.g., in the presence of transient network or equipment faults due to congestion, etc.

Turning now to the Figures, aspects of the present invention will be discussed in greater detail. Referring to FIG. 1, embodiments of the invention may be used in an otherwise conventional packet switched network 10, in which a packetized data source (e.g., VoD headend) 11, such as a cable television (CATV) company or the like, transmits a packetized (e.g., video) Transport Stream via suitable link to a network core 12, which may include some combination of asynchronous transfer mode (ATM), frame relay, or IP (e.g., Internet) networks. As shown, the TS may pass through various network elements, such as one or more routers 14, and/or peripheral elements 16 such as DSLAMs (Digital Subscriber Line Access Multiplexers), before arriving at end users 18, 20. Those skilled in the art will recognize that a DSLAM is a network element, usually located at a telephone company central office, that demultiplexes signals received via network 12, and distributes them to end users 18, 20 via Digital Subscriber Line (DSL) connections.

As discussed hereinbelow, embodiments of the present invention include one or more computing elements 102 (FIG. 2), which may be placed nominally anywhere within network 10, to facilitate a reduction in bandwidth of individual Transport Streams destined for users 18, 20 such as may be desired to alleviate network congestion or to expand the service area. For example, elements 102 may be placed at or proximate to headend 11 to permit all system routers to take advantage of the markings should the requirement for dropped traffic occur. Alternatively, elements 102 may be spaced further downstream, such as within network elements 14 of network core 12, at peripheral network elements 16, and/or at locations therebetween.

As another example, computing elements 102 may be disposed integrally or immediately upstream of DSLAM elements 16, to mark TSs destined for particular end users 20 located beyond a primary service radius 22. The DSLAMs may then selectively drop packets to produce a TS of sufficiently reduced bandwidth to effectively expand the service area to supplementary service radius 24, to potentially increase the number of potential end users (e.g., DSL customers) by trading off required bandwidth for reach.

These embodiments may thus be used to mark packets prior to transmission of the packet over the network 10 (e.g., at the headend 11), or alternatively, in real time during transmission (e.g., at locations downstream from headend 11). In the latter instance, marking may conveniently occur at the edge of the network (e.g., at or near network elements 16) so that computing elements 102 need only be disposed proximate to those network elements 16 that feed longer length DSL links, for example. Such a configuration may permit those edge devices that don't require packet drops to be relatively simple, e.g., to operate in a conventional manner.

Figure 2:
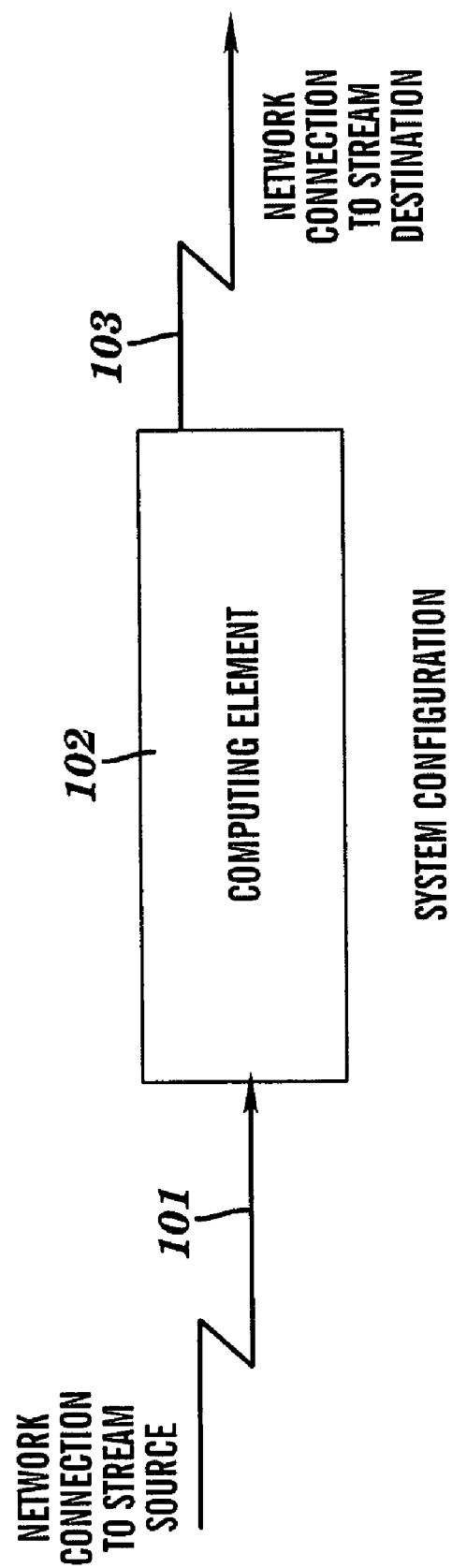
FIG. 2 is a schematic view of an embodiment of a computing element of the present invention, disposed within a portion of the network environment of FIG. 1.

Referring now to FIG. 2, analysis of the IP TS packets may be effected using a computing element 102 which taps existing network traffic at source and destination network connections 101 and 103, respectively. In a particular embodiment, the computing element is inserted in series with an existing network link, using fiber, copper, or wireless interfaces. Computing element 102 may be a discrete, stand-alone device, or alternatively, may be incorporated (e.g., co-located), as discussed hereinabove, within a network element 14, 16, etc., (FIG. 1) such as a switch, encoder, or router.

Figure 3:
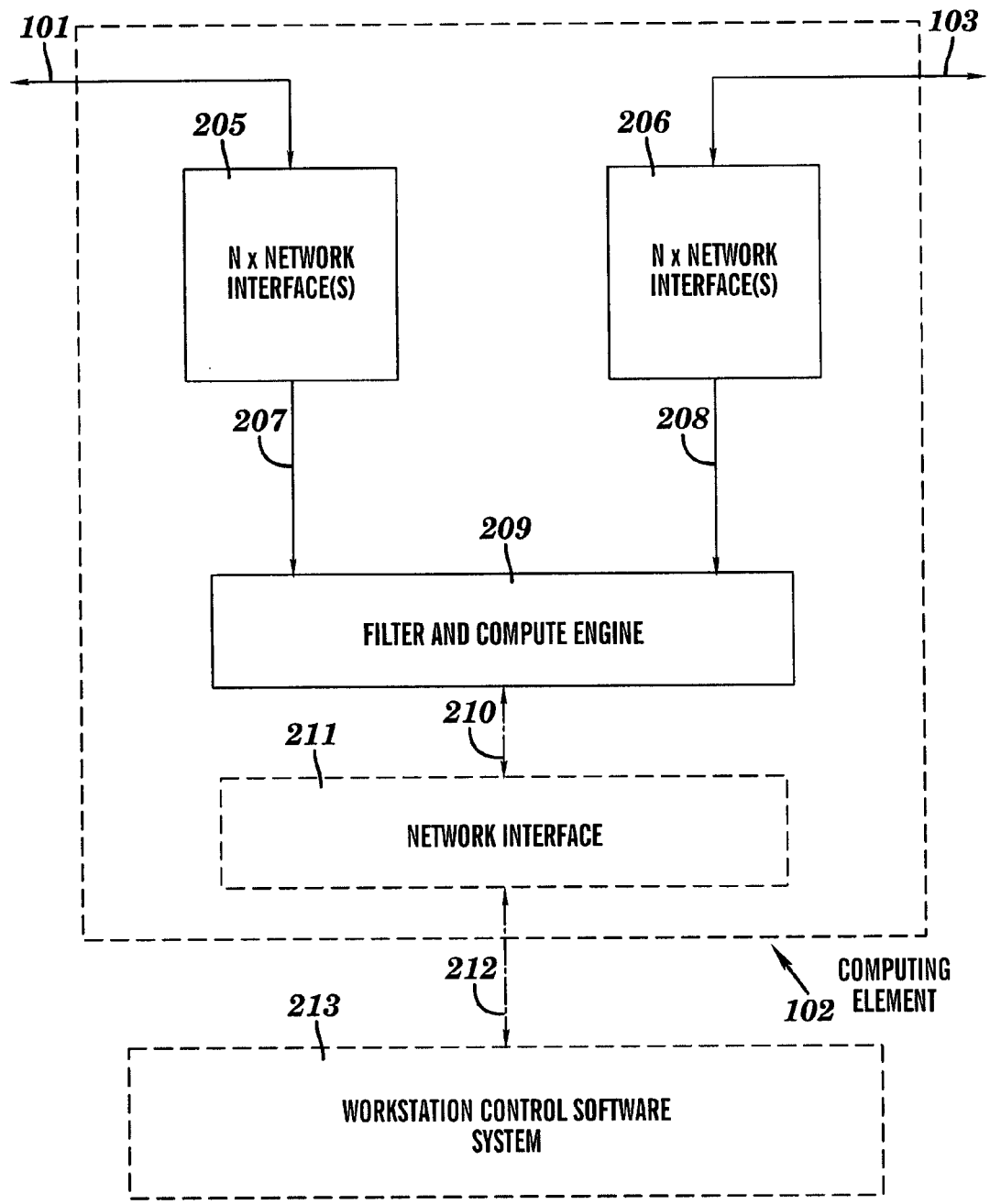
FIG. 3 is a more detailed schematic view of the computing element of FIG. 2, with optional features shown in phantom.

Turning now to FIG. 3, computing element 102 operates on a streaming media's packet components (e.g., Transport Stream payload) received from source connection 101, processes the streaming flow, and then transmits the modified flow to destination connection 103. The filter and compute engine 209, may receive the streaming media's packets using the network interface(s) 205 and connection 207 and convey the results of the processing (i.e., packet marking) operations via connection 208 to the computing element's network interface(s) 206 for delivery of the modified streaming media output to the destination connection 103 for ultimate delivery to end users 18, 20 (FIG. 1).

Packets of one or more TSs received by filter and compute engine 209 may be identified by their common destination and source addresses, e.g., in accordance with conventional protocol layering (e.g., OSI 7-Layer Model) schemes. The skilled artisan will recognize, however, that any of various combinations of parameters may be used to identify the streaming media flow, including layer 2 and layer 3 protocol addresses, layer 4 protocol port number, VLAN ID, etc. The filter and compute engine 209 may modify one or more flows by analyzing a flow's packets to determine the content thereof prior to being marked as discussed in greater detail hereinbelow with reference to FIGS. 4-6. The modified flow is then forwarded (via network interface(s) 206) to downstream network element(s) where the packets thereof may be selectively dropped prior to transmission of remaining packets to end users 18, 20 (FIG. 1).

An optional workstation and workstation control software (e.g., management system) 213, shown in phantom, may be connected to an optional network interface 211 via a suitable link (such as a native network interface) 212, as shown in phantom. System 213 may then be used to dynamically change the configuration of the computing element 102. Such changes may include configuring the number of streams, and/or selecting particular streams (e.g., selecting those having predetermined destination information), for marking by compute engine 209. Although management system 213 is typically remote to engine 209, it should be noted that in other embodiments, network interface 211, link 212, and management system 213 may be physically co-located with the compute engine 209 and need not be external.

The network interfaces 205 and 206 used for receiving and transmitting the streaming media may include any type network link protocol that supports packet-based transmission including, but not limited to, 802.3 (Ethernet), 802.4, 802.5, USB, ATM, SONET, 802.11, Fibre-channel, Firewire or 1394, Infiniband, Bluetooth, 802.11, 802.15, 802.16, 802.17, or ZIGBEE. It should be noted that more than one network interface 205, 206 can be used to receive and transmit network traffic. For example, FIG. 3 illustrates computing element 102 with up to N network interfaces 205 and 206, with streams fed to/from engine 209 via connections 207 and 208.

It should also be noted that a pure hardware, a pure software, and a hybrid hardware/software implementation of the compute engine components is envisioned. Moreover, although embodiments of the present invention have been shown and described as stand-alone modules connectable to a data stream, they may also be co-located with nominally any network component. For example, embodiments may include hardware, software, and/or hybrid hardware/software components disposed within otherwise conventional network elements or nodes, such as IP switches, routers, encoders, servers, VoD servers, VoIP servers, PCs, blades, DSLAMs, Set Top Boxes (e.g., for CATV), IP Phones, Firewalls, etc., and combinations thereof.

Also, various kinds of interfaces can be used for establishing a packet-based communication session between the workstation system 213 and the computing element, such as (but not limited to) a gigabit Ethernet network or a 10/100 Mbit/s Ethernet network interface card. Moreover, one skilled in the art can envision using various current and future interfaces and, hence, the type of packetized network interface used should not be used to limit the scope for the present invention.

Additionally, the present invention provides the ability to scale with improvements in network conduit technology. For example, the faster the network conduit, the more streams that can be modified.

Furthermore, embodiments of the present invention may include a computer program code based product, including a storage medium having program code stored therein which can be used to instruct a computer to perform any of the methods associated with the present invention. The computer storage medium may include any of, but not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, and/or any other appropriate static or dynamic memory or data storage devices.

Figure 4:
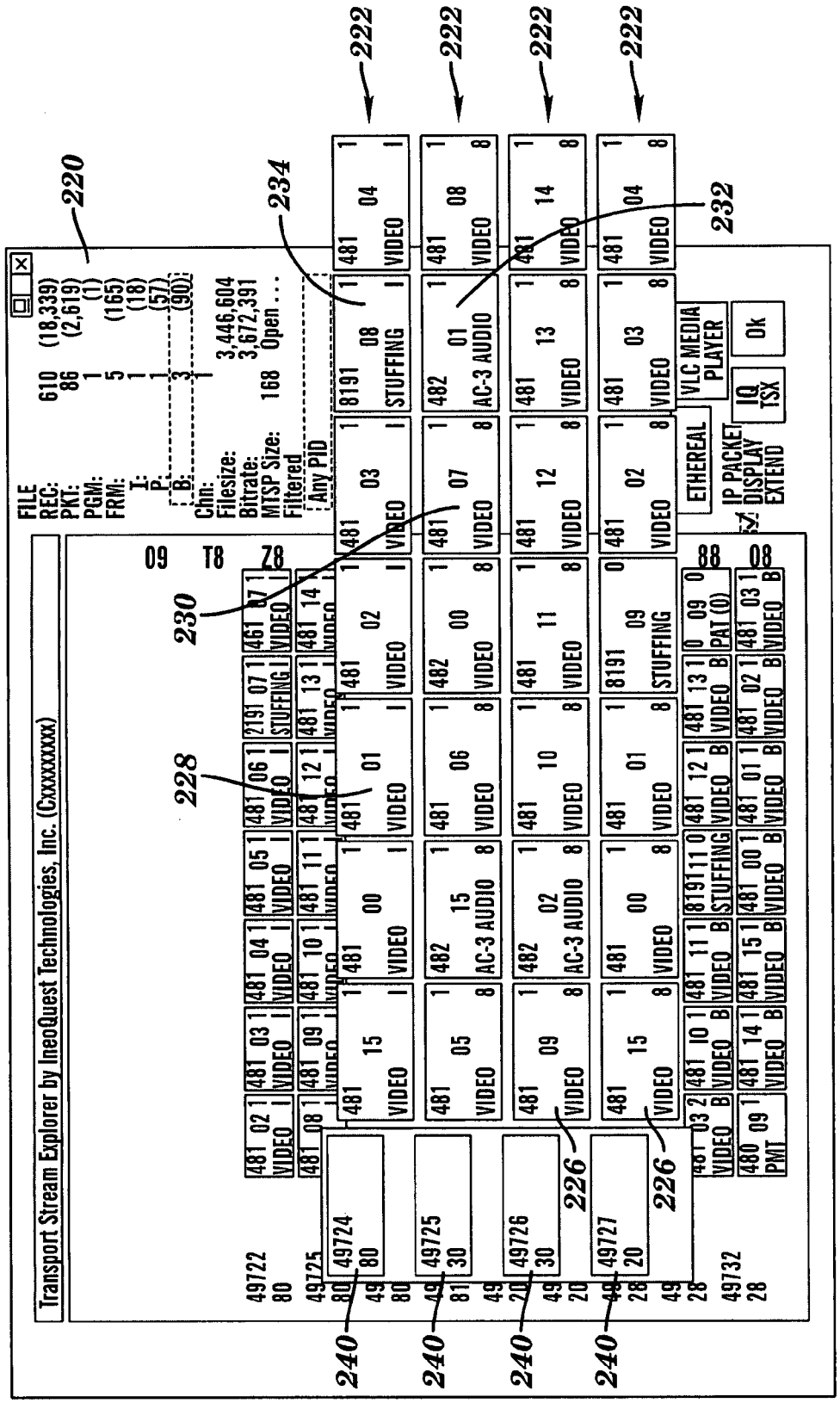
FIG. 4 is a screen display of a Graphical User Interface associated with operation of an embodiment of the present invention.

Referring now to FIGS. 4-5B, operation of representative embodiments of the present invention is described in greater detail. Such operation is conveniently described with reference to an optional Graphical User Interface (GUI) 220, such as may be accessed via optional management system 213 (FIG. 3).

As shown in FIG. 4, GUI 220 is configured to display characteristics of the TS payload of each respective IP TS packet 222 passing through filter and compute engine 209 (FIG. 3). In the particular example shown, these payloads each include seven, 188 byte TS packets 226, containing various media fragments. These packets are analyzed by engine 209 (FIG. 3) to identify, and optionally display, information identifying their content characteristics. In the example shown, one such packet is identified as containing a portion of an MPEG I Frame, as shown at 228, while packets identified as respectively containing portions of an MPEG B Frame, Audio, and Stuffing, are shown at 230, 232, and 234. A bitmask table is used in which each of the IP TS packets 222 have been identified with respective partial bitmask values 240 of 0x80 (I Frame), 0x30 (B Frame and Audio), and 0x20 (B Frame).

Engine 209 then aggregates the identified characteristics of the individual TS packets 226, etc., of each IP TS packet 222 to provide a summary value therefor. Turning now to FIGS. 5A and 5B, this aggregation is described in greater detail with respect to a representative IP TS packet 222'. As shown, analysis of IP TS packet 222' has revealed that it contains seven, 188 byte TS packets 226 which respectively include I Frame, B Frame, B Frame, I Frame, Audio, PSI, and Stuffing content. Engine 209 assigns a partial bitmask value 240 to each TS packet, corresponding to this content, such as in accordance with the partial bitmask table of FIG. 5A. Thus, in this example, the partial bitmask values 240 corresponding to the TS content of packet 222' are: 0x01; 0x02; 0x02; 0x01; 0x08; 0x20; and 0x0, as shown in FIG. 5B. These hexadecimal bitmask values are then combined by engine 209 to generate an aggregated bitmask value 242 of binary 0010 1011 (0x2B Hex) which corresponds to the characteristics of the TS packets of the entire IP TS packet 222'. In the example shown, the bitmask values do not indicate whether more than one TS packet of a particular type (e.g., B frame) are found within the IP TS packet. Rather, the aggregated bitmask value simply indicates that at least one example of a particular packet type is found therein. However, those skilled in the art will recognize that the bitmask values may be modified to indicate whether multiple instances of a particular packet type are located within a particular IP TS packet.

Although various exemplary aspects of an IP TS packet have been identified, it should be understood that substantially any packet characteristics may be identified and used in connection with embodiments of this invention, to provide flexibility in marking according to a network operator's priority of the content. This also allows the invention to be adapted for other encodings that may not rely on I, B, & P types.

Another exemplary bitmask table is shown in the following Table III:

TABLE III

| | |
|---|---|
| VIDEO_IFRAME | 0x80 |
| VIDEO_BFRAME | 0x20 |
| VIDEO_PFRAME | 0x40 |
| VIDEO_UNKNOWN | 0x02 |
| VIDEO_CHANGE | 0x01 |
| VALUE_AUDIO | 0x10 |
| VALUE_PSI | 0x08 |
| VALUE_OTHER | 0x04 |

In this example, the "video change" status bit indicates that a frame type has ended and another frame has begun in this IP TS packet. This condition could be 'B end' with a 'start of P', or any other combination.

With reference to FIG. 5B, the aggregated bitmask value 242 is correlated, e.g., using a lookup table 244, to a priority weighting 246. In particular embodiments as shown, priority weighting 246 is in a format (e.g., 8 bit IP TOS value set) readily identifiable by a conventional (e.g., legacy) network element 14, 16, such as a router or DSLAM. The IP TS packet 222' is then marked with priority weighting 246, such as by placement within the TOS/DSCP field 248 thereof, so that the packets may be selectively dropped as needed by the network element(s) in accordance with their priority weightings, to reduce the bandwidth of the transport stream. For example, the packets may be dropped in inverse relation to their priority weightings, so that those packets marked with the lowest priority weightings are dropped prior to those with higher priority weightings, e.g., until a desired bandwidth is achieved. These low priority packets may be dropped in response to instructions from a network management agent based on static or dynamic regional or local bandwidth availability, dynamic video service vs. other service priority, or other network policy-based decision making.

It is contemplated that by placing the priority weightings within conventional TOS/DSCP fields, various legacy network elements (e.g., routers) may operate in a conventional manner to drop packets in accordance with demands of current network conditions. Packets may thus be dropped in response to instructions from a network device based on factors such as static local bandwidth availability; dynamic local bandwidth availability; static regional bandwidth availability; dynamic regional bandwidth availability; dynamic video service versus other service priority; and network policy-based decision making.

In addition, or alternatively, packets may be dropped by a network element 14, 16, in response to specific instructions such as received from a recipient of the packets, e.g., a STB disposed at the end user 18, 20, and/or from an originator of the transport stream. This approach may be useful in conjunction with the aforementioned expanded (e.g., DSL) service to service radius 20 (FIG. 1). Such specific instructions may be adjusted in real time as needed due to current network conditions, and/or may simply instruct the network element to drop all packets, or all packets having particular destination address and/or program headers, and which have a priority weighting below a predetermined level.

It should be understood that while bitmask value 242 is mapped to IP TOS values in the foregoing example(s), value 242 may be mapped to nominally any other desired format, such a DSCP value set, VLAN priority, VLAN ID and priority set, and/or combinations thereof.

Moreover, the marking provided by these embodiments may be effected on either conventional multicast or unicast (VoD) flows. In addition, these embodiments do not require the use of conventional end station success/quality feedback, for enhanced simplicity and elimination of traffic that such feedback would otherwise require. However, those skilled in the art should recognize that if desired, feedback systems such as Automatic Repeat-reQuest (ARQ) error control systems, may be optionally used with various embodiments hereof, without departing from the spirit and scope of the invention.

As a still further alternative, embodiments of computing element 102 may be configured to pack (e.g., at headend 11, FIG. 1) or repack (e.g., at downstream locations) the IP TS packets of a particular transport stream to prevent the mixing of predetermined types of content. For example, I frames, Audio, or PSI may be prevented from mixing with B frames in an IP packet. This may help ensure that relatively low priority content is grouped together, to improve the likelihood that dropping these packets will have minimal discernable effect on the quality of the programming received by end users 18, 20. This packing/re-packing approach, if effected at an upstream location (e.g., at headend 11) may achieve better reduced bandwidth performance downstream at the expense of decreased quality downstream. This tradeoff may therefore justify effecting this re-packing at the edge (e.g., proximate network elements 16, FIG. 1), to allow for both higher bandwidth, high quality streams upstream, as well as a lower bandwidth, reduced quality stream downstream.

In addition, another application of the bandwidth reduction capabilities of the instant invention, may be in combination with conventional Forward Error Correction (FEC) algorithms and equipment. For example, if a limited bandwidth link with a high bit error rate must be traversed, but FEC cannot be natively applied due to insufficient available bandwidth for the FEC correction stream, then the video bandwidth can be lowered as taught herein, enough to enable FEC to be applied. The net effect is that although the video bandwidth is reduced to recover bandwidth for FEC, the video bandwidth that is delivered is nominally error free (low bit error rate).

CONCLUSION

A system and method has been shown in the above embodiments for measuring, exposing and enhancing the dynamic behavior of streaming media over a packet-based network. While various preferred embodiments have been shown and described, it will be understood that there is no intent to limit the invention by such disclosure but, rather, it is intended to cover all modifications and alternate constructions falling within the spirit and scope of the invention as defined in the appended claims. For example, the present invention should not be limited by the number of network interfaces, number of filters, number of streams handled by the compute engine, type of packetized network conduit, location of control software, choice of hardware or software implementation of bandwidth provisioning or filter or compute engine, type of streaming media data, choice of hardware or software implementation, computing environment, or specific hardware associated with the network interfaces, filter device, or compute engine system.

The above systems may be implemented in various computing environments. For example, the present invention may be implemented on a conventional IBM PC or equivalent, multi-nodal system (e.g., LAN) or networking system (e.g., Internet, WWW, wireless web). All programming and data related thereto are stored in computer memory, static or dynamic or non-volatile, and may be retrieved by the user in any of: conventional computer storage, display (i.e., CRT) and/or hardcopy (i.e., printed) formats. The programming of the present invention may be implemented by one skilled in the art of computer systems and/or software design.

Having thus described the invention, what is claimed is:

1. A computer-implemented method for reducing the bandwidth of MPEG transport streams during transmission over a packet-switched network, said method comprising:

identifying, by one or more computing elements, characteristics of a plurality of media fragments disposed within each of a plurality of packets of a transport stream, wherein the characteristics define one or more of: one or more MPEG frames, one or more audio frames, PSI, and stuffing content;

aggregating, by the one or more computing elements, the identified characteristics into a summary value for each of the plurality of packets;

correlating, by the one or more computing elements, the summary value to a priority weighting identifiable by one or more network elements; and marking, by the one or more computing elements, each of the plurality of packets with the priority weighting, wherein each of the plurality of packets are configured for being selectively dropped by the one or more network elements in accordance with their priority weightings to reduce the bandwidth of the transport stream.

2. The method of claim 1, wherein each of the plurality of packets include Internet Protocol (IP) packets.

3. The method of claim 2, wherein the summary value includes a bit mask value.

4. The method of claim 3, wherein the correlating includes mapping the bit mask value to a Weighting Lookup Table.

5. The method of claim 4, wherein the correlating further includes mapping the Weighting Lookup Table to the priority weighting.

6. The method of claim 5, wherein the priority weighting is selected from the group consisting of: a TOS value, a DSCP value set, a VLAN priority, and a VLAN ID and priority set.

7. The method of claim 6, wherein the marking includes placing the priority weighting in the IP packets.

8. The method of claim 7, wherein the marking includes placing the priority weighting in a TOS/DSCP field in the IP packets.

9. The method of claim 2, wherein the identifying includes identifying characteristics of a plurality of media fragments disposed within each of the plurality of packets, wherein each of the plurality of packets is weighted in accordance with an aggregation of TS components of each IP packet.

10. The method of claim 1, wherein the marking is effected in real time during transmission of each of the plurality of packets over the network.

11. The method of claim 1, wherein the marking is effected prior to transmission of each of the plurality of packets over the network.

12. The method of claim 9, wherein each of the plurality of packets are configured for being dropped in inverse relation to their priority weightings.

13. The method of claim 12, wherein each of the plurality of packets are configured for being dropped in response to instructions from a network device based on factors selected from the group consisting of: static local bandwidth availability, dynamic local bandwidth availability, static regional bandwidth availability, dynamic regional bandwidth availability, dynamic video service versus other service priority, and network policy-based decision making.

14. The method of claim 12, wherein each of the plurality of packets are configured for being dropped in response to instructions from a recipient of each of the plurality of packets.

15. The method of claim 12, wherein the marking is effected by the one or more network elements.

16. The method of claim 15, wherein the marking is effected by the one or more network elements selected from the group consisting of: a stream transport device, an encoder, and a router.

17. The method of claim 15, wherein the marking is effected at the headend of the transport stream.

18. The method of claim 12, wherein each of the plurality of packets are configured for being dropped in response to instructions from an originator of the transport stream.

19. The method of claim 1, wherein each of the plurality of packets have a common destination address.

20. The method of claim 19, wherein each of the plurality of packets have a common program header.

21. The method of claim 20, wherein the common program header includes a header associated with one or more of the group consisting of: an individual channel, an individual program, Video on Demand, Broadcast, Standard Definition, High Definition, and MPTS streams.

22. The method of claim 1, wherein the one or more network elements are selected from the group consisting of: a router, a switch, a dslam, a video multiplexer, and an optical transport device.

23. The method of claim 1, further comprising selectively dropping each of the plurality of packets having the priority weighting below a predetermined weighting, wherein a resultant stream bandwidth is reduced.

24. The method of claim 23, wherein relatively greater numbers of transport streams are accommodated on the same network.

25. The method of claim 23, wherein the transport streams are transported a further distance.

26. The method of claim 1, wherein the marking is effected on multicast and unicast (VoD) flows.

27. The method of claim 2, further comprising packing the IP packets to prevent mixing at least one of I frames, audio, and PSI with B frames in the IP packets.

28. The method of claim 1, further comprising:
identifying the transport stream destined for a predetermined user; and
selectively dropping individual ones of each of the plurality of packets in accordance with their priority weightings to reduce the bandwidth of the transport stream destined for the predetermined user.

29. The method of claim 1, further comprising applying error correction to the transport streams.

30. an apparatus for reducing the bandwidth of an MPEG transport stream during transmission over a packet-switched network, said apparatus comprising: means for identifying, by one or more computing elements, characteristics of a plurality of media fragments disposed within each of a plurality of packets of a transport stream, wherein the characteristics define one or more of: one or more MPEG frames, one or more audio frames, PSI, and stuffing content; means for aggregating, by the one or more computing elements, the identified characteristics into a summary value for each of the plurality of packets; means for correlating, by the one or more computing elements, the summary value to a priority weighting identifiable by one or more network elements; and means for marking, by the one or more computing elements, each of the plurality of packets with the priority weighting, wherein the marked packets are each configured for being selectively dropped by the one or more network elements in accordance with their priority weightings to reduce the bandwidth of the transport stream.

31. The apparatus of claim 30, further comprising:
a computing element comprising a compute engine communicably coupled in series with upstream and downstream network interfaces;
said upstream network interface configured to receive the transport stream and transmit the transport stream to the compute engine;
said compute engine configured to identify characteristics of a plurality of media fragments disposed within each of a plurality of packets of the transport stream, aggregate the characteristics into a summary value for each of the plurality of packets, correlate the summary value to a priority weighting identifiable by one or more network elements, and mark each of the plurality of packets with the priority weighting to produce a modified transport stream of marked packets; and
said downstream network interface configured to receive the modified transport stream from said compute engine and transmit the modified transport stream to the network.

32. a computing system for reducing the bandwidth of MPEG transport streams during transmission over a packet-switched network, wherein the computing system includes computer readable program code residing on a non-transitory computer readable medium having a plurality of instructions stored thereon that, when executed by a processor, cause the computing system to perform operations comprising: identifying characteristics of a plurality of media fragments disposed within each of a plurality of packets of a transport stream, wherein the characteristics define one or more of: one or more MPEG frames, one or more audio frames, PSI, and stuffing content; aggregating the identified characteristics into a summary value for each of the plurality of packets; correlating the summary value to a priority weighting identifiable by one or more network elements; and marking each of the plurality of packets with the priority weighting, wherein each of the plurality of packets are configured for being selectively dropped by the one or more network elements in accordance with their priority weightings to reduce the bandwidth of the transport stream.

* * * * *